United States Patent
St. John et al.

(10) Patent No.: US 6,524,426 B1
(45) Date of Patent: Feb. 25, 2003

(54) PLASTIC LUMBER PALLETS

(75) Inventors: Marc A. St. John, Reynoldsburg, OH (US); Kevin M. Hartke, Powell, OH (US)

(73) Assignee: Edison Welding Institute, Columbus, OH (US)

( * ) Notice: Subject to any disclaimer, the term of this patent is extended or adjusted under 35 U.S.C. 154(b) by 211 days.

(21) Appl. No.: 09/596,229

(22) Filed: Jun. 15, 2000

Related U.S. Application Data

(60) Provisional application No. 60/139,227, filed on Jun. 15, 1999.

(51) Int. Cl.[7] ................................................ B65D 19/38
(52) U.S. Cl. ............................. 156/309.6; 156/304.1; 156/304.2; 156/304.6; 108/51.11; 108/51.17; 108/57.25; 108/57.34; 108/901; 108/902
(58) Field of Search ..................... 156/322, 94, 309.6, 156/309.9, 306.6, 73.5, 244.17, 244.11, 569, 304.1, 304.2, 304.4, 304.5, 304.6; 108/57.25, 57.34, 51.11, 901, 902, 57.17, 51.17

(56) References Cited

U.S. PATENT DOCUMENTS

| | | | |
|---|---|---|---|
| T886,012 I4 | 5/1971 | Small | |
| 4,059,057 A | * 11/1977 | Carnwath | 108/52.1 |
| 4,287,836 A | * 9/1981 | Aoki | 108/51.1 |
| 4,909,892 A | * 3/1990 | Quinn et al. | 156/499 |
| 5,042,397 A | * 8/1991 | Fiedler | 108/57.18 |
| 5,170,722 A | 12/1992 | Friesner | |
| 5,401,347 A | 3/1995 | Shuert | |
| 5,417,167 A | 5/1995 | Sadr | |
| 5,456,189 A | * 10/1995 | Belle Isle | 108/51.1 |
| 5,458,069 A | 10/1995 | Stolzman | |
| 6,352,039 B1 | * 3/2002 | Woods et al. | 108/57.25 |

FOREIGN PATENT DOCUMENTS

| | | | | |
|---|---|---|---|---|
| JP | 57-053319 | * | 3/1982 | B29C/27/06 |
| JP | 61-130031 | * | 6/1986 | B29D/31/00 |

* cited by examiner

*Primary Examiner*—Deborah Jones
*Assistant Examiner*—Vivek Koppikar
(74) *Attorney, Agent, or Firm*—Kremblas, Foster, Phillips & Pollick

(57) ABSTRACT

A plastic pallet assembly is formed from plastic lumber by melting sections of runners and cross members and contacting them to join said runners and said cross members to form a pallet. A machine having an assembly table, cross members for supporting and moving pallet runners in a vertical direction, a support table for a pallet cross member, hot plates moveable in a vertical direction and in a horizontal direction for insertion between the runners and the cross member, and a force bar moveable in a vertical direction for applying a force to the runners, hot plates and cross member. A process for producing a plastic lumber pallet in which the runners are placed on a support bar and raised in a vertical direction, a cross member is placed on a support table, hot plates are inserted between the runners and cross member, pressure is applied by means of a force bar and a portion of the runners and cross member is melted after which the hot plate is withdrawn by raising the runners and hot plate and the molten section of the runners and cross member are brought in contact to join the runners and cross member.

4 Claims, 5 Drawing Sheets

PLASTIC LUMBER PALLETS

CROSS REFERENCE TO RELATED APPLICATION

This application claims the benefit of U.S. Provisional Application No. 60/139,227 filed on Jun. 15, 1999 all of which is incorporated by reference as if completely written herein.

BACKGROUND OF THE INVENTION

1. Field of the Invention

This invention pertains to plastic lumber pallets and more particularly to a method and device for joining of plastic lumber to form pallets.

2. Background of the Invention

As the recycling of plastic continues in the United States, there is a great need for the increase in the utilization of the recycled product. Some of the plastic being recycled is ground up and extruded into a product known as plastic lumber. Plastic lumber is similar in shape and texture to its wood counterpart. Recycled plastic lumber offers many of the same features as wood.

An industry utilizing large amounts of both hardwood and softwood is the pallet industry. The pallet industry used 4.5 billion feet of hardwood alone in 1995, which was 37% of the total United States production. The federal government is becoming increasingly concerned about the environmental impact this continued consumption of lumber has on the environment. As the price of wood lumber continues to rise, many segments of this industry are looking for an alternative to wood. A good alternative is plastic lumber. Plastic lumber is made out of post-consumer plastic and can be used in most of the same applications wood lumber is used. One of these uses is in the construction of pallets. The pallet industry has been introducing plastic pallets for some time, but these pallets are made from mainly virgin plastic. Most plastic pallets are made using plastic injection molding, which is a very expensive process. Alternatively, the pieces of the pallet are fastened using metallic screws or bolts which present stress points for fracture and failure and separation problems on recycle. A need exists for an inexpensive and reliable method of joining plastic lumber to form durable plastic lumber pallets. A need exists for a device for quickly aligning and joining plastic lumber into an integral structural unit.

Therefore it is an object of the present invention to produce pallets out of recycled plastic lumber.

Another object of the present invention is to produce strong and reliable joints for plastic lumber pallet structures.

Yet another object of the present invention is to provide a device for joining plastic lumber to form pallets.

Still another object of the present invention is to provide a device that produces plastic lumber pallets of various size.

Another object of the present invention is to provide a support structure for plastic lumber joining.

Yet another object of the present invention is to provide a machine for quickly and accurately aligning plastic lumber for fabrication into a plastic lumber pallet.

Another object of the present invention is to provide a reliable heating source for joining plastic lumber.

Yet another object of the present invention is to provide a recyclable pallet.

Another object of the present invention is to provide a pallet joint of sufficient strength such that the pallet lumber fails prior to joint failure.

Another object of the present invention is to provide a pallet support and fabrication machine that is inexpensive to construct.

Another object of the present invention is to provide a pallet assembly machine that accommodates a wide range of lumber sizes.

Another object of the present invention is to provide a pallet assembly machine that is capable of manufacturing a wide variety of pallet sizes.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

SUMMARY

The present invention features a machine for forming plastic lumber pallets from plastic runners and plastic cross members. It comprises 1) a cross-member support for supporting one of the pallet cross members, 2) a runner support member for maintaining at least one of the runners in essentially transverse relation with the cross member, and 3) a hot plate positioned between the cross member and one of the runners and heating and melting simultaneously a portion of the top of said cross member and a portion of the bottom of said runner. In addition, the runner support member is formed so as to maintain at least two of the runners in spaced apart relation with respect to each other. A pneumatic vertical movement unit moves the runner support members in an up and down direction. A transverse movement unit moves the hot plate in essentially a transverse direction with respect to the cross-member support. A parallel movement unit moves the hot plate in a direction essentially parallel to that is along the cross-member support. Finally, a vertical movement unit moves the hot plate in an up and down (vertical) direction. Such movement allows the hot plate to be inserted between the runner and cross member and withdrawn when a portion of the runner and cross-member surfaces have been heated to a molten state.

A pressure application member applies pressure to a layered assembly of the hot plate positioned between the cross member and one of the runners during the hot plate heating process in which the hot plate melts simultaneously a portion of the top of the cross member and a portion of the bottom of the runner. The pressure application member also applies pressure to an assembly of a molten portion of the top of the cross member in contact with a molten portion of the bottom of the runner to form the weld or bond between the cross member and the runner. A vertical movement unit is used to move pressure application member in an up an down direction so as to apply pressure to the heating and welding assemblies.

A base such as an assembler table is used to mount the cross-member support, the runner support members, the hot plate and the pressure application member. The pallet assembler table comprises four legs, two ends, and two sides jointed with fasteners such as nuts or bolts for a modular construction or by welding for a more permanent structure, the latter being especially suited for large production runs of pallets of the same size. The machine of the current invention is especially effective for make plastic lumber pallets from solid plastic lumber, especially lumber made from recycled plastics.

The current invention also features a process for welding a plastic lumber runner to a plastic lumber cross-member. Such welds are used to forming the plastic lumber pallet. The process consists of the steps of 1) loading a plastic lumber runner on a runner support member; 2) placing a plastic lumber cross-member on a cross-member support. 3) separating the runner from the cross-member to produce a gap between the runner and cross member, 4) inserting a hot plate in the gap between the runner and the cross member, 5) contacting the runner with a first side of the hot plate and simultaneously contacting the cross member with a second, opposite side of the hot plate, 6) heating the hot plate to a temperature sufficient to form a molten portion of at least one of either the cross member and said runner, 7) separating the runner from the hot plate to form a space between the hot plate and the runner, 8) separating the hot plate from the cross-member, 9) withdrawing the hot plate, and 10) contacting the cross member with the runner in the region of the molten portion to form a weld between the cross member and the runner. The process is further aided by applying a force to the runner, the hot plate, and the cross-member during the heating step and applying a force to the runner and the cross-member during the contacting step of the cross member and the runner to form a weld between the runner and the cross-member.

Figure 1:
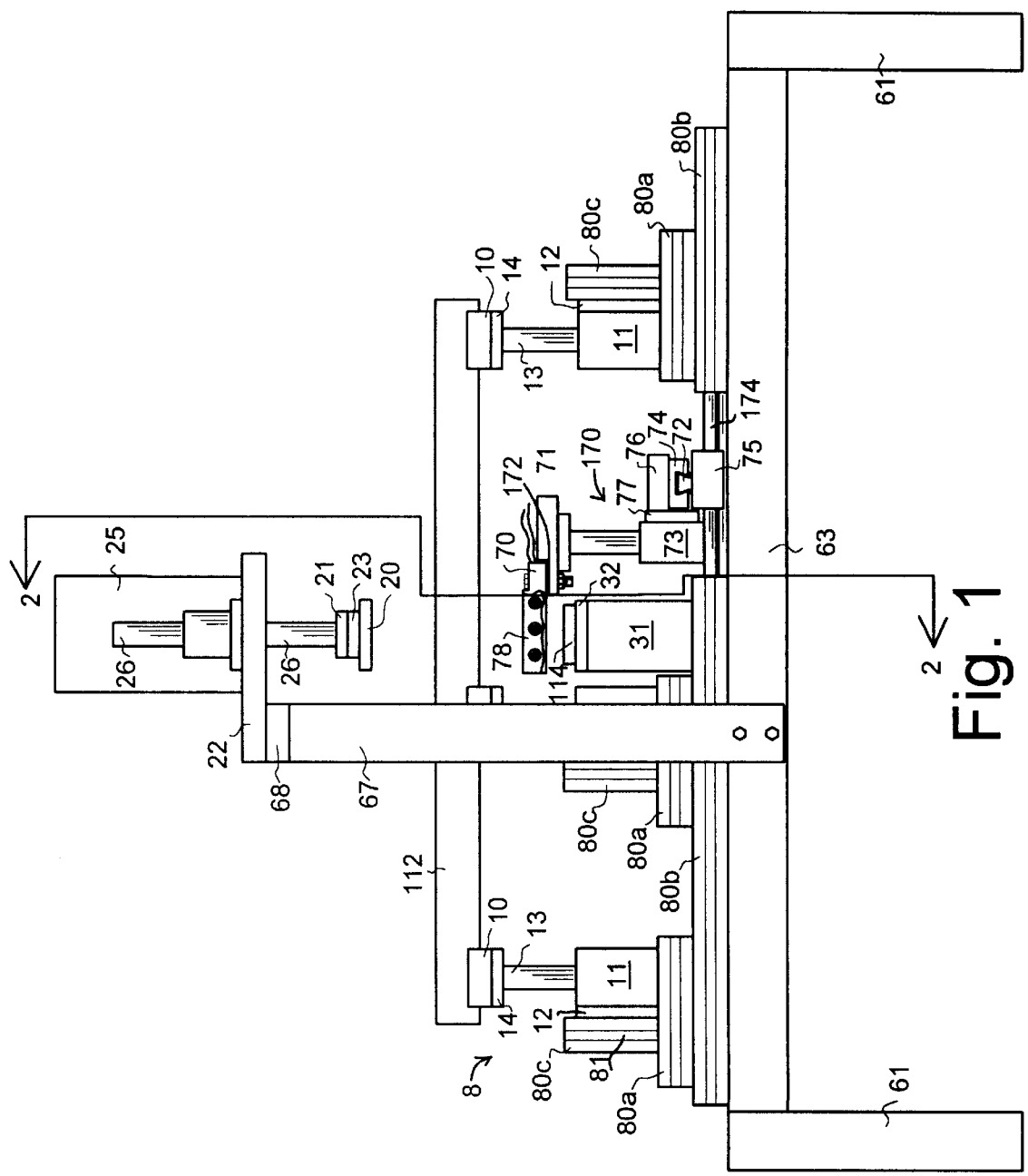
FIG. 1 is a side view illustrating the pneumatic, plastic-lumber pallet fabricating embodiment of the present invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 2:
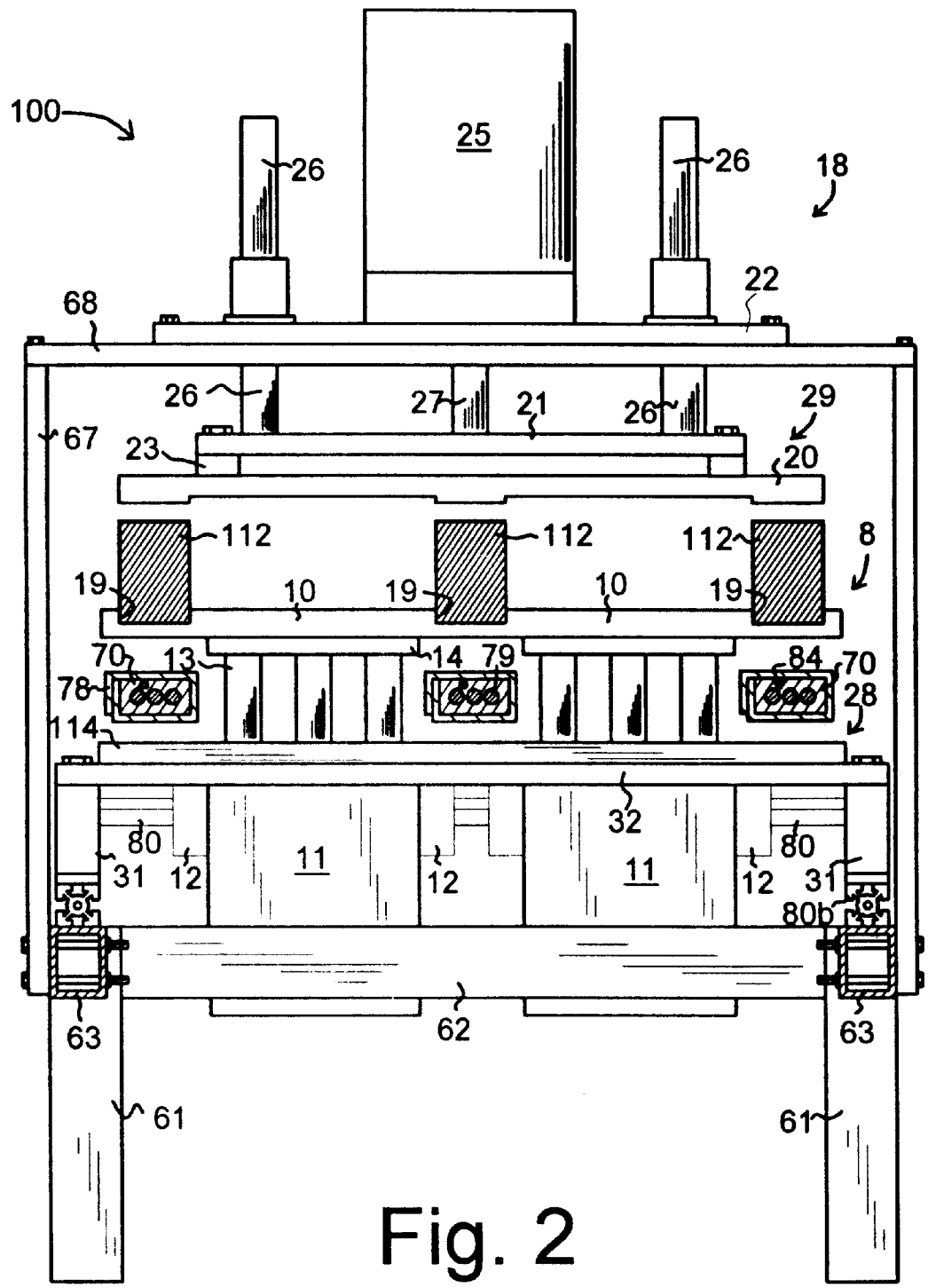
FIG. 2 is a cross section view of the pneumatic, plastic-lumber pallet fabricating embodiment of the present invention taken along line 2—2 of FIG. 1.

With reference to the drawings and initially FIGS. 1 and 2, a machine 100 is illustrated for forming plastic lumber pallets from plastic runners and cross members, and is especially useful for preparing plastic pallets from solid plastic lumber prepared from recycled plastic.

The machine consists of three basic units, 1) a cross-member support unit (cross-member welding table) 28 having as its main component, cross member support member 32 which supports pallet cross member 114; 2) a runner support unit 8 having as its main component, runner support member 10; and 3) a hot plate unit 170, having as its main component, hot plate 70. A pressure or force application unit 18 has as its main component pressure or force application member 20. The runner support unit 8, the hot plate unit 170, and the force application unit 18 each have vertical movement units for providing up and down movement to runner support members 10, hot plates 70, and pressure application member 20. Such vertical units may comprise springs, screw assemblies, screw, or hydraulic assemblies. As shown here, pneumatic assemblies were used but it is to be realized that the other noted assemblies can be used with comparable results. The hot plate unit 170 also has an "x-y" manipulation system that permits the hot plates to be inserted or withdrawn in a direction transverse, i.e., at substantially right angles to, the cross-member support member 32 (slide unit 75) or to be moved parallel to the cross-member support unit 32 (slide unit 74). An assembler table 60 is used to support the various components but it is to be realized that any substantially solid horizontal surface will suffice for operation of machine 100.

Pallet Runner Support Unit (8)

Figure 4:
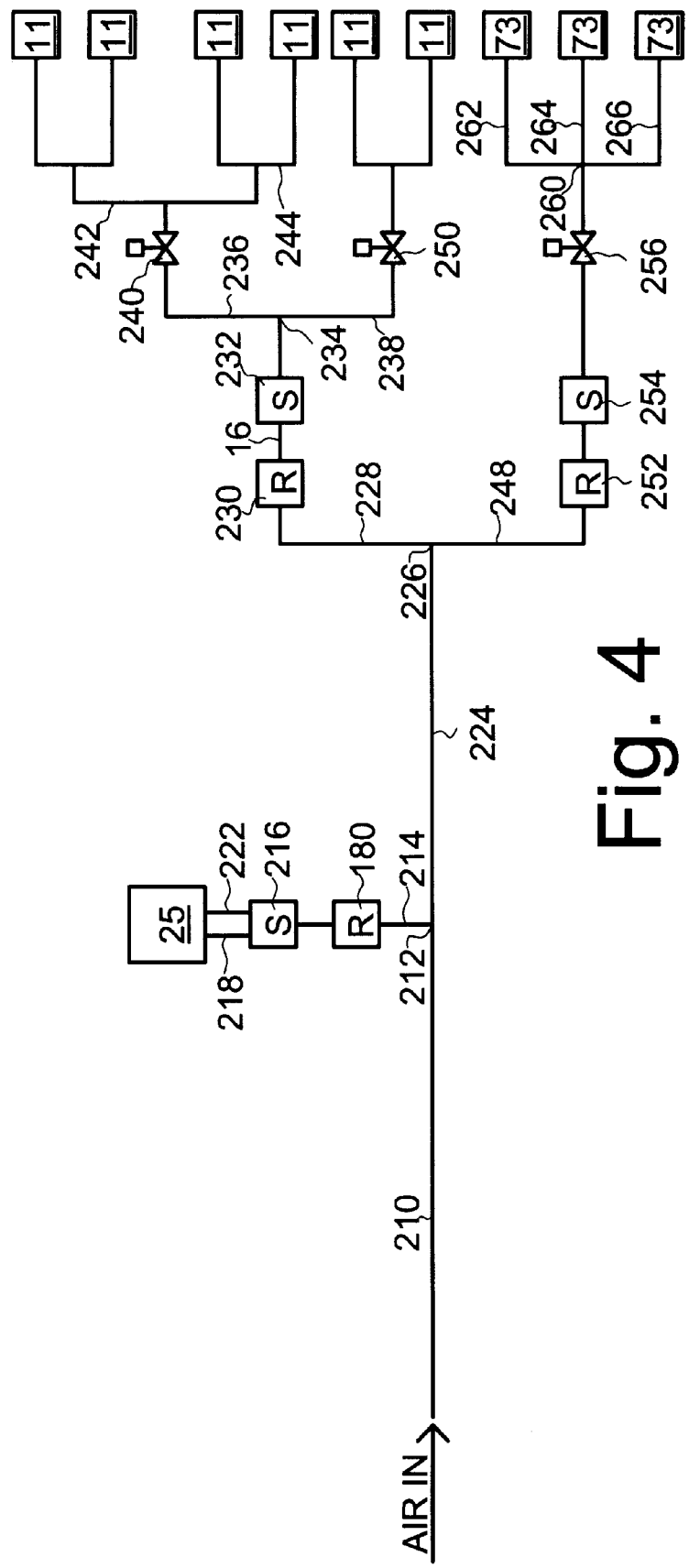
FIG. 4 is a schematic view of the pneumatic system used with the invention shown in FIG. 1.
Figure 5:
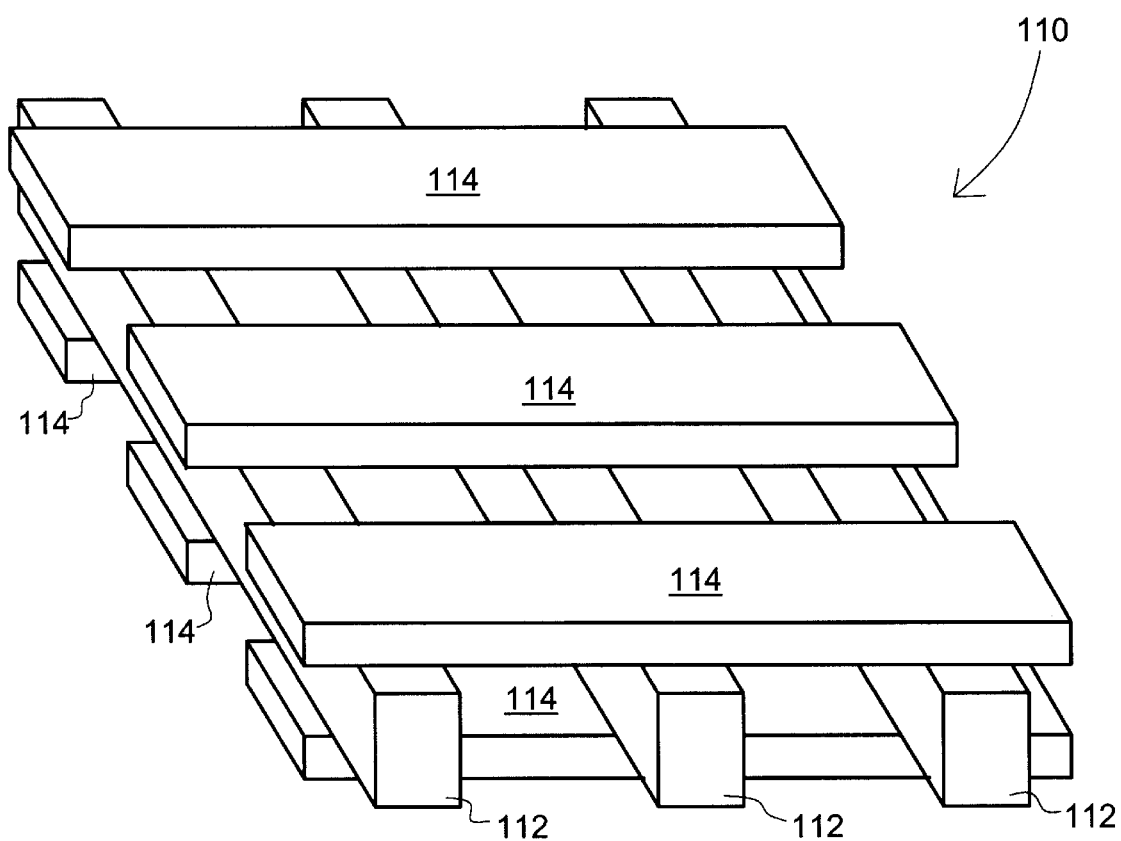
FIG. 5 is a perspective view of a plastic-lumber pallet.

This system utilizes pneumatics and hardware which support the runners 112 initially and the pallet 110 (FIG. 5) during the welding process. During the process, cross members 114 are welded to the runners 112 and thus this system supports more and more of the pallet as cross members 114 are added to one or typically opposite sides of the runners 112. The support system utilizes pneumatics, but hydraulics, ball and screw, or spring actuation can also be used. As seen in FIG. 4, the system is interconnected to provide synchronized movement of the pallet. This means that all three pallet support and alignment members 10 are designed to move at the same time. The support members 10 of the support system 8 are also used to maintain a spaced apart distance, typically an equal distance, between the runners 112 of pallet 110. To this end, alignment slots 19, as shown in FIG. 2, have been permanently cut into support member 10. However, it is to be realized that an actuated system could be installed which would allow for varying runner widths and alignments. As shown in FIG. 2, each support member 10 consists of a long member 10 into which slots 19 are machined to accept runners 112 and maintain them in spaced apart relation with each other during the welding process. The runners 112, and the runners 112 with welded cross members 114 as the pallet moves 110 toward completion, are raised and lowered with the cylinder-slide unit 11, which is a standard product from Parker-Hannifen of Cleveland Ohio.

The cylinder-slide unit 11 is attached to the aluminum extrusion 80 using a mounting bracket 12. Pistons 13 extending from cylinder-slide unit 11 are attached to plate 14 which is attached such as by bolting to the bottom of alignment member 10. An air line 16 accommodates pressurized air to operate pistons 13 which raise and lower the alignment member 10. The mounting bracket 12 can be adjusted along the length of the aluminum extrusion 80 to accommodate different size pallets. Extruded aluminum is used through the entire machine to accommodate different size pallets.

As illustrated in FIG. 1, an aluminum extrusion 80b is bolted along the length of table side member 63. A second piece of extrusion 80c is bolted endwise to extrusion 80a which in turn is bolted to extrusion 80*b*. Identical units of extrusion 80*a,* 80*b,* and 80*c* are bolted to the top of the side members 63 of the assembler table 60. A fourth extrusion 80 (FIG. 2) is bolted at its ends to the upright extrusion pieces 80*c* on opposite sides 63 or table 60. In such an arrangement, extrusion 80 can be adjusted in a vertical direction by moving extrusion 80 along channel 81 of extrusion 80*c*. Similarly extrusion 80 can be moved back and forth, i.e., to the center or end of table 60 by moving repositioning extrusion 80*c* with respect to 80*a* or repositioning extrusion 80*a* with respect to 80*b*.

As shown in FIG. 1, machine 100 is illustrated with three support systems 8 which are all of similar design. To adjust for different size pallets, support systems 8 can be added or removed depending on the pallet layout.

Pallet Cross-Member Support Table (28)

The cross-member support table 28 provides support for the cross-member 114 and the pallet 110 during the welding process. The support table 28 is formed from two support legs 31 (FIG. 2) each mounted to extrusion member 80*b* on opposite sides 63 of table 60. The support legs 31 are made of cold-rolled steel. The cross-member support 32 is made of 4340 steel to provide rigidity and solid support. It is attached at each end to the support legs 31, typically by bolting. As with the runner support system 8, the support table 28 can be moved along the length of table side 63 by moving legs 31 in the channel 81 of extrusion 80*b*. Such movement allows for accommodation of varying pallet sizes.

Hot-Plate Welding Unit (170)

The hot-plate welding unit 170 is composed of three hot-plates 70 and hot-plate manipulation components. The hot-plates 70 are made out of aluminum and protected with a Teflon sheet 78. The hot-plates 70 contain three cartridge heaters 79 and a thermocouple 84 for temperature control. The power is supplied to the cartridge heaters 79 by a standard 120 V AC power feedback unit supplied by the Anderson-Bolds Company. The hot-plates 70 are designed to allow for consistent temperature distribution. The hot-plates 70 are insulated from the hot-plate support bar 71 with ceramic inserts 172. This keeps the hot-plate support bar 71 from sinking the heat away from the hot-plates 70. The hot-plate support bar 71 is slotted where the hot-plates 70 are attached to allow for alignment of the hot-plates 70 with different size pallets 110. The hot-plates 70 are manipulated in an up and down direction with a pneumatic cylinder-slide unit 73, which is a standard product of Parker-Hannifen. As with the runner support system 8, the hot plates could be manipulated with hydraulics, screw-drive, or spring mechanisms. The pneumatic cylinder-slide unit 73 is attached to a backing plate 77 which in turn is attached to an x-y manipulation system by means of attachment plate 76. The x-y manipulation system is made up of the x-y slide support bar 72 and a linear ball bearing slide 74. Slide 74 allows for side to side movement of hot plates 70, i.e., movement along the length of (parallel to) cross-member support 32. A slide support 174 is mounted to the top of table side 63 and supports ball bearing slide 75 which allows for travel of the hot plates 70 along the length of the table 60, that is, transverse (at right angles to) cross member support 32. The linear ball bearing slides 74, 75 and rails 72, 174 are standard Thompson catalog rails and linear slides. Other manipulation equipment can be added to the unit to allow for additional automated movement of hot plates 70.

Force Application Unit (18)

The welding force unit is composed of cylinder support members 22, 68, a cylinder 25, and force translation system 20,21,23. The unit 18 is designed to allow for an even force across the runner 112 and cross-member 114 during the heating and welding process. The cylinder support member 68 is attached to the sides 63 of the pallet assembler 60 by means of upright members 67. Support member 22 is then attached to cross member 68. This rigid attachment allows for rigid support of the pneumatic cylinder 25. However and as noted previously for the other systems, pneumatics could be replaced with other force methods. The pneumatic cylinder 25 is used to supply force and utilizes a pressure regulator 180 for controlled force. The cylinder 25 produces a linear force across pressure application member 20 with the assistance of two side rails 26. The cylinder shaft 27 and side rails 26 are attached to the force application member 20 with an attachment bar 21 and two spacer blocks 23. The attachment bar 21 and spacer blocks 23 allow for even force distribution across all three weld joints (FIG. 2). The force is applied to the runner/cross-member joints through the force application member 20. This bar is machined, but could accommodate manipulation equipment to allow for different pallet sizes and setups.

Assembler Table 60

Figure 3:
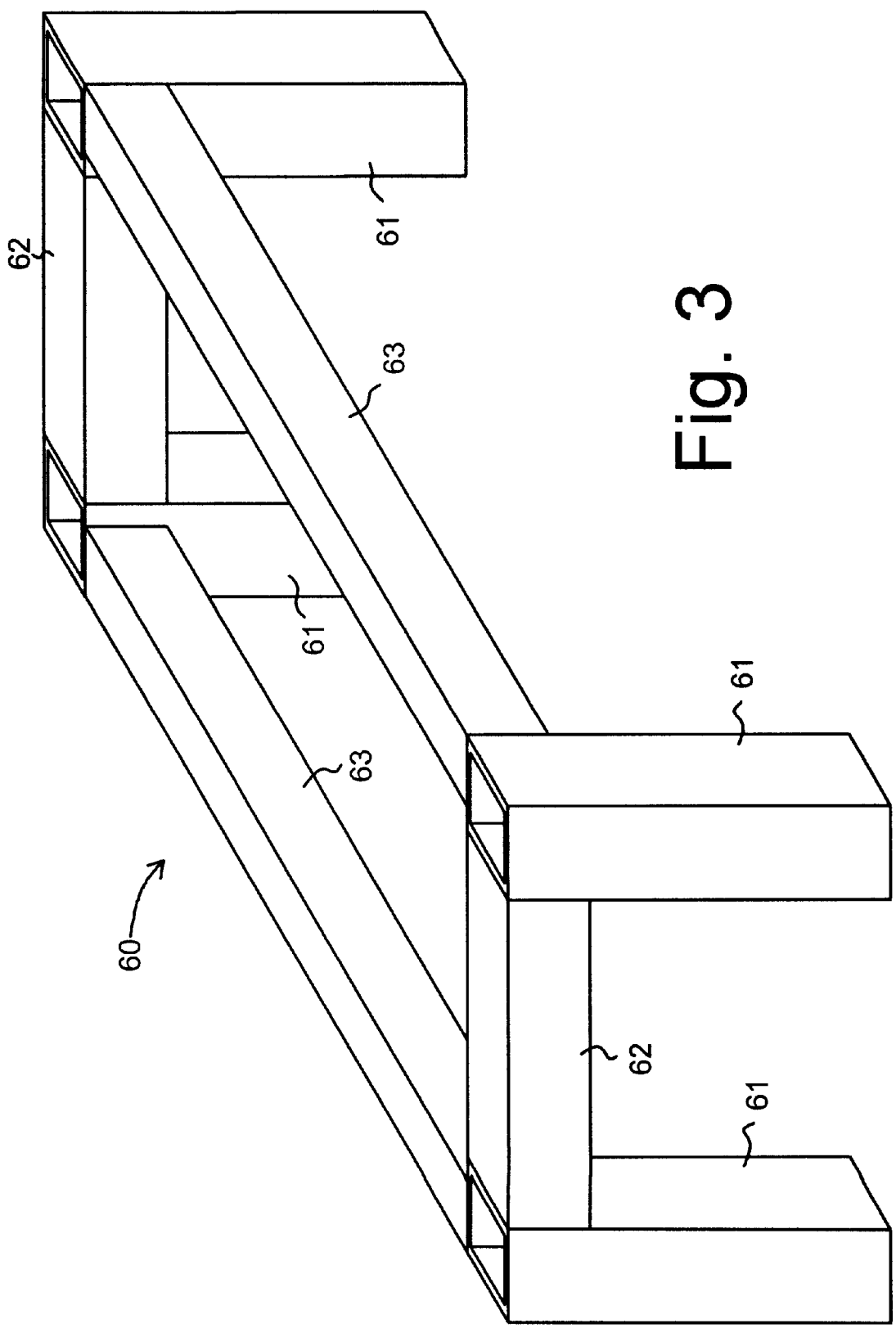
FIG. 3 is a perspective view of the assembler table of the present invention.

The pallet assembler table 60 shown in FIG. 3 was designed to allow for a reduced weight system with maintained strength and rigidity. The table (legs 61, ends 62, and sides 63) is made out of standard extruded square tubing and utilizes a modular design. The modular design is utilized to allow for different size pallets and setups. The table can utilize a completely modular setup with bolted together end members 62 as well as bolted together cross-members 63. For more permanent installations where pallets are of uniform size, the sides, ends 62, and legs 61 can be welded together and reinforced with angular braces in the corners where the sides 63 and ends 62 meet the legs 61. The legs 61 and ends 62 of the assemble table 60 where made of 6×6 inch tubular steel with the sides 63 made of 4×6 tubular steel.

Pneumatic Sytem (200)

The pneumatic system 200 is shown in FIG. 4 and utilizes an airflow which allows for synchronized movement throughout the entire machine. Air from a convenient source such as an air compressor enters line 210 and is split off into two flows at tee 212. A first flow goes to line 214, then to regulator 180, a manual solenoid 216, and then to the pressure application cylinder 25. Two lines 218, 222 are used from the solenoid 216 to cylinder 25, one line is used to, apply pressure via pressure application member 20 to the pallet assembly while the other line is used for quick retraction of the pressure application member 20. The other line 224 from tee 212 is divided again at tee 226 where line 228 goes to regulator 230, then to solenoid 232 via line 16 and then to tee where it is divided into lines 236, 238. Line 236 goes to valve 240 which is divided into two lines 242 and 244 with each line going to two sets of two cylinder units 11. Line 238 goes to valve 250 which goes to a set of two cylinder units 11. As with the pressure application cylinder, two lines may be used for each runner support member cylinder 11, one line to raise runners 112 and the other to lower runners 112. Line 248 from tee 226 goes to regulator 252, then to solenoid 254, valve 256, and finally to a set of three hot plate cylinder units 73 via split 260 and lines 262, 264, 266. As with units 11 and 25, two lines may be used with cylinders 73, one for raising hot plates 70 and the other to lower pneumatically hot plates 70.

Operation

The system is operated using manual air solenoids to sequence the process. The welding process contains the follow steps:

1. Three pallet runners 112 are loaded into the slot 19 of pallet support member 10. The runners 112 are aligned with one end on the welding backing plate 30. The pallet support system 8 is in the up position, that is, the runners 112 are in a raised position above cross-member support 32.
2. A cross-member 114 is loaded onto the cross-member support plate 32. The cross-member 114 is made flush with the end of the runners.
3. The hot-plates 70 are brought into position with the hot-plate support system 170 is in the up position by moving the slide 75 toward the end of table (to the left of FIG. 1). The hot-plates 70 are now be between the cross-members 114 and the runners 112.
4. The pallet support system 8 is lowered and, at the same time, the hot-plate support system 170 is lowered to allow the cross members 114 and the runners 112 to come in contact with the upper and lower surfaces of the hot plates 70.
5. The welding force system 18 is actuated to lower pressure member 20 and exert pressure on runner 112 which allows all the members of the welding assembly to come in good contact. The force applied with the force system 18 varies depending on the surface of the lumber being welded.
6. The hot plates 70 are turned on and allowed to come to temperature heating both a portion of the under side of runner 112 (in contact with the upper side of hot plate 70) and a portion of the top of cross-member 114 which is in contact with the under side of hot plate 70.
7. The cross members 114 and runners 112 are observed until a good melt is recognized. A general indication of a good melt is excess melted plastic coming out around the hot-plates 70.
8. The welding force member 20, pallet support member 10, and the hot-plates 70 are all raised. The hot plates 70 are put out of the way by moving slide 75 to the right end of table 60 and then lowered.
9. The pallet support member 10 and the welding force member 20 are lowered to allow the molten surface portions to come in contact. The joints are allowed to cure for thirty seconds to a minute.
10. The welding force member 20 and the pallet support members 10 are raised and the pallet is indexed for the next cross member weld to be completed.

The welding process depends on the type, shape and surface of the lumber used. Too much force during the welding process should be avoid to avoid squeezing all of the melted material out of the joint. The same precaution should be taken when heating the joints.

EXAMPLE 1

Runners 112 were 4-×6-in.×3-ft long of recycled high-density polyethylene (from Plastic Lumber Company, Akron, Ohio). The cross members 114 were 1-×6-in. ×3-ft-long recycled high-density polyethylene. The parts were loaded and the hot plates were warmed up for the first weld.

The welding cycle consisted of bringing the parts in contact with the hot plates 70 until sufficient melting had been achieved. After the melting occurred, the hot plates 70 were removed from the joint and the parts were brought together to make the weld. An even flash bead was produced around the entire joint. The bead indicated an evenly heated joint and an overall good weld of very good strength.

EXAMPLE 2

The next size of lumber that was used was a 4-×4-in.×3-ft-long piece of HDPE (high density polyethylene) for runners 112 and 1-×6-in.×3-ft piece for cross members 114. This pallet was made using three cross members 114 on top and bottom. The pallet 110 was completed and the joints were very good, with flash around the entire joint.

EXAMPLE 3

To further investigate the process, a 2-×4-in.×3-ft-long runner 112 was used with a 1-×6-in.×3-ft-long cross member 114. Such a pallet with these dimensions is very similar to the common shipping pallet. This time the pallets were made using five cross members on top and three cross members on bottom.

Pallet Testing

Pallets were tested under conditions of actual use.

Impact Test

The first test was an impact test involving a 2'/2-ton skid loader. The pallet was positioned against a cement wall and skid loader forks were placed against the runners perpendicularly. The force of the skid loader was applied by engaging the loader with full force against the pallet. No damage resulted from this test. In an effort to increase the force, the skid loader was backed up and allowed to reach a velocity of 4 miles per hour before ramming the pallet. The initial attempt caused no damage; the pallet buckled slightly upon impact and returned to its original shape when the force was removed. Ramming was repeated six times after which the pallet started to fail. The failure mainly occurred on the cross members. There was also some failure above the weld joint, but no failure through the actual weld joint. Some buckling and failure occurred but that was above the weld joint.

Load Test

The next test was an overall weight test. A 17,500-lb tractor was driven on top of the pallet repeatedly trying to produce failure. As the tractor was driven on top of the pallet, the cross members started to bend. After the tractor was driven off of the pallet the pallet retained the original shape. The pallet was very resilient under these heavy weight conditions.

Deflection Test

The deflection test consisted of putting an 800 lb load at one end of the pallet and inserting the forks of the skid loader only half way into the pallet. The produced a very large shear force throughout the entire pallet. The deflection test produced no failure in the pallet.

Other Tests

Seven hundred and fifty pounds (750) lb of feed bags were placed on the pallet for a day to see if a deflection occurred. At the end of the day, no deformation was observed. The pallet was also picked up with a skid loader several times to observe the over all rigidity. The pallet remained very rigid through the entire test.

Utility

Pallets formed according to the present invention are especially useful for a wide variety of applications. In the food industry, the absence of fasteners keeps slip sheets from being torn. Plastic pallets can be washed after every use for increased sanitation. Pallets can be fabricated to meet unique material handling specifications. Plastic pallets can be used much longer than wood pallets and then be recycled instead of thrown away when damaged. Plastic pallets add increased stability and rigidity throughout the shipping process, have higher strength and longer useable lifetime. Unlike wood, plastic can be shipped in and out of the country, so pallets could be made in the United States and exported for use or vice versa.

The consumer use of plastic continues to increase and the supply of wood continues to decrease. The recycled pallet allows for a viable use for post-consumer plastic and does not have environmental impacts.

It is possible that changes in configurations to other than those shown could be used but that which is shown is preferred and typical. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

We claim:

1. A process for welding a plastic lumber runner to a plastic lumber cross-member used in forming a plastic lumber pallet comprising:
   a. loading a solid, plastic-lumber runner on a runner support member;
   b. placing a solid, plastic-lumber cross-member on a cross-member support;
   c. separating said runner from said cross-member so as to produce a gap between said runner and said cross member;
   d. inserting a hot plate in said gap between said runner and said cross member;
   e. contacting said runner with a first side of said hot plate and simultaneously contacting said cross member with a second, opposite side of said hot plate;
   f. heating said hot plate to a temperature sufficient to form a molten portion of at least one of said cross member and said runner;
   g. separating said runner from said hot plate to form a space between said hot plate and said runner;
   h. separating said hot plate from said cross-member;
   i. withdrawing said hot plate;
   j. contacting said cross member substantially transversely with said runner in the region of said molten portion to form a weld between said cross member and said runner of said plastic-lumber pallet in which said cross-member and said runner are positioned one on top of the other.

2. The process for welding a plastic lumber runner to a plastic lumber cross-member according to claim 1 wherein said heating step forms a molten portion on both said cross member and said runner.

3. The process for welding a plastic lumber runner to a plastic lumber cross-member according to claim 1 further comprising the step of applying a force to said runner, said hot plate, and said cross-member during said heating step sufficient for excess melted plastic to come out from around said hot plate.

4. The process for welding a plastic lumber runner to a plastic lumber cross-member according to claim 1 further comprising the step of applying a force to said runner and said cross-member during said contacting step of said cross member and said runner to form a weld between said runner and said cross-member and sufficient to form a flash bead of said molten plastic around said weld.

* * * * *